United States Patent
Goodall et al.

(10) Patent No.: US 7,460,512 B2
(45) Date of Patent: *Dec. 2, 2008

(54) SELECTING AN ACCESS POINT ACCORDING TO A MEASURE OF RECEIVED SIGNAL QUALITY

(75) Inventors: David S. Goodall, Randwick (AU); Philip J. Ryan, Stanmore (AU); Andrew F. Myles, St. Ives (AU); Ludovico N. de Souza, Normanhurst (AU)

(73) Assignee: Cisco Technology, Inc., San Jose, CA (US)

( * ) Notice: Subject to any disclaimer, the term of this patent is extended or adjusted under 35 U.S.C. 154(b) by 335 days.

This patent is subject to a terminal disclaimer.

(21) Appl. No.: 11/186,045

(22) Filed: Jul. 20, 2005

(65) Prior Publication Data

US 2005/0249129 A1 Nov. 10, 2005

Related U.S. Application Data

(63) Continuation of application No. 10/700,011, filed on Nov. 3, 2003, now Pat. No. 6,940,843, which is a continuation-in-part of application No. 10/367,010, filed on Feb. 14, 2003, now Pat. No. 6,898,198.

(51) Int. Cl.
*H04Q 7/24* (2006.01)
(52) U.S. Cl. .................... 370/338; 370/332
(58) Field of Classification Search ........... None
See application file for complete search history.

(56) References Cited

U.S. PATENT DOCUMENTS 5,809,430 A    9/1998  D'Amico ............ 455/525
5,815,811 A    9/1998  Pinard et al. ........ 455/434

(Continued)

FOREIGN PATENT DOCUMENTS

JP    2000101596    4/2000

(Continued)

OTHER PUBLICATIONS

Yutaka Hayakawa, "Wireless LAN Measurement System and Dedicated Software", Yokogawa-Giho, Yokohawa Electric Corporation, vol. 46 No. 2, pp. 5 1-54,Apr. 22, 2002 (Provided in Japanese and English).

*Primary Examiner*—Michael J Moore, Jr.
(74) *Attorney, Agent, or Firm*—Dov Rosenfeld; Inventek

(57) ABSTRACT

An apparatus for inclusion and a method for operation in a station (STA) of a wireless network. The method includes received data from at least one remote station and determining a measure of the signal quality, e.g., a measure of the EVM from samples of the data received from the remote station(s). If the remote station(s) is/are access point(s), the station selects an access point for association according to criteria that include the measure of the EVM from the remote station. If the received data includes a request management message, the station responds to the request management message with a response management message that include a measure of the EVM of the received data corresponding to the request management message. Thus, the remote station receiving the response management message receives an indication of the quality of the link between the station and the remote station without the receiving remote station necessarily being EVM-capable.

44 Claims, 7 Drawing Sheets

U.S. PATENT DOCUMENTS

| | | | |
|---|---|---|---|
| 5,912,921 A | 6/1999 | Warren et al. | 375/220 |
| 6,760,313 B1 | 7/2004 | Sindhushayana et al. | 370/252 |
| 2002/0060995 A1 | 5/2002 | Cervello et al. | 370/332 |
| 2002/0069038 A1 | 6/2002 | Cooper | 702/191 |
| 2002/0075834 A1 | 6/2002 | Shah et al. | 370/337 |
| 2004/0066759 A1 | 4/2004 | Molteni et al. | 370/329 |
| 2004/0078598 A1 | 4/2004 | Barber et al. | 713/201 |
| 2004/0100898 A1 | 5/2004 | Anim-Appiah et al. | 370/210 |
| 2004/0235423 A1 | 11/2004 | Kwak et al. | 455/67.13 |

FOREIGN PATENT DOCUMENTS

| | | |
|---|---|---|
| WO | WO 03/061192 | 7/2003 |

SELECTING AN ACCESS POINT ACCORDING TO A MEASURE OF RECEIVED SIGNAL QUALITY

The present invention is a continuation of U.S. patent application Ser. No. 10/700,011 now U.S. Pat. No. 6,940,843 to inventors Goodall, et al., filed Nov. 3, 2003, and titled SELECTING AN ACCESS POINT ACCORDING TO A MEASURE OF RECEIVED SIGNAL QUALITY. The contents of U.S. patent application Ser. No. 10/700,011 are incorporated herein by reference. U.S. patent application Ser. No. 10/700,011 is a continuation-in-part of U.S. patent application Ser. No. 10/367,010 now U.S. Pat. No. 6,898,198 to inventors Ryan, et al., titled "SELECTING THE DATA RATE OF A WIRELESS NETWORK LINK ACCORDING TO A MEASURE OF ERROR VECTOR MAGNITUDE" filed 14 Feb. 2003, and incorporated herein by reference.

BACKGROUND

This invention is related to wireless networks. One aspect is a method for a wireless station of a wireless network to select an access point according to a received signal quality measure. One version uses a measure of the error vector magnitude (EVM).

Wireless networks such as wireless local area networks (WLANs) have recently become popular. A WLAN may be an ad-hoc network in which any wireless station (STA) may communicate directly with any other STA, or an infrastructure network in which one STA acts as an access point (AP). All other STAs of the network associate with the AP, and communicate only via the AP. The AP may be connected to other networks by a wired or wireless connection.

The description herein will assume a wireless network that conforms to the IEEE 802.11 standard, and will use the terminology of the IEEE 802.11 standard. The invention, however, is not restricted to such a network.

A station of a wireless network, i.e., a STA, includes a physical layer processor (PHY) and a MAC processor. An AP is a STA that transmits messages (beacons or probe responses) that provide information (PHY and MAC information) for other stations that enable such other stations to associate with the AP. Beacons or probe responses are similar except that a beacon is broadcast not necessarily in response to any external event, and a probe response is transmitted in response to the AP receiving a probe request message.

For any particular STA that desires to associate with an AP, there may be several APs with which to associate. STAs often scan for APs with which they can associate and desire to associate with the "best" AP.

A STA that wants to operate as a client station in an infrastructure network, also called a basic service set (BSS), will usually attempt to identify all the APs with which it can associate by scanning one or more channels, e.g., for beacons and probe responses. The STA will so scan at start-up and periodically thereafter.

An AP that acts as a repeater AP will also scan one or more channels to identify potential parent APs, although usually only on start-up or if its parent AP is no longer available.

The scanning may be active or passive. In a "passive scan", a STA listens for beacons from APs on one or more channels. In an "active scan", a STA sends a probe request message and listens for probe responses in response to the probe request, on one or more channels.

A STA may also record other packets from an AP in addition to beacons and probe responses.

Scans provide information at the MAC level such as the data rates supported by the AP, the identifier of service set (the SSID), security parameters for communicating with the AP, the load at the AP, and so forth. Scans also provide PHY layer information. In particular, when a STA receives the beacon or probe response, the STA records the received signal strength indication (RSSI) at the PHY of the receiving STA.

The information provided by scanning, after appropriate weighting, is often used to determine the "best" AP with which an association should be attempted.

The IEEE 802.11a PHY standard defines RSSI as a measure by the PHY sublayer of the energy observed at the antenna used to receive the packet. RSSI is measured by the PHY during packet reception and is passed up with the packet. The RSSI is often used to differentiate the signal strength from candidate APs and to determine the "best" AP according to the received signal strength when all other measures, such as loading, etc., are equal.

Those skilled in the art will recognize that the RSSI is a measure of signal strength but not signal quality. It has been found that the RSSI is not a good indicator of the signal quality or a good measure for "best" AP selection. This may be for a variety of reasons. For example, when scanning, often the only packets available for a STA to measure are sent at a relatively low rate. This is particularly true if RSSI values for AP selection are only available from a beacon or a probe response, which are usually sent at a low rate. The RSSI value from a low rate packet only provides a very coarse indication of how well the link will support high rate packets. Such an RSSI value, for example, does not account for factors that significantly reduce signal quality such as multipath or the presence of strong interferers.

Using the RSSI to select the "best" AP can result in a lower throughput and latency than would occur if a measure of signal quality rather than signal strength was used for the selection. Selecting the AP using the RSSI can also lead to frequent roaming, and hence instability. These are particular issues for voice and other applications that require high throughput or low latency.

Thus there is a need in the art for a method of selecting an AP for association based on a measure indicative of the received signal quality and of the quality of communication achievable on the link between the AP and a client station.

SUMMARY

Described herein is a method for operation in a wireless station, the method including wirelessly receiving a signal from a remote station corresponding to a packet transmitted by the remote station, demodulating samples of the received signal to produce demodulated signals from the remote station, and selecting whether or not to communicate with the remote station based on a measure of the received signal quality, e.g., the received signal EVM of data transported via the link between the station and the remote station.

In one application, the remote station is an access point, and the selecting is whether or not to associate with the remote access point. In another application, the remote station is a station and the selecting is to select whether or not to communicate with the remote station on an ad-hoc basis.

In one embodiment, the transmitted packet corresponding to the received signal includes the measure of the EVM obtained from samples of signals received by the remote station corresponding to data transmitted by the station, such that the station need not be capable of determining the EVM In another embodiment, the method further includes determining at the station the measure of the received signal EVM from samples of the received signal. According to an improvement, wherein the transmitted packet corresponding to the received signal includes a measure of the received signal EVM obtained from samples of signals received by the remote station corresponding to data transmitted by the station, such that the selecting by the station uses measures of the quality of data transmitted both directions via the link between the station and the remote station Also described herein is an apparatus embodiment for inclusion in a station of a wireless network. The apparatus includes a radio receiver to wirelessly receive data from at least one remote station. The data is transmitted by the remote station as at least one packet of data. The receiver includes an analog-to-digital converter producing samples of signals received at the station from the remote station. The apparatus includes a demodulator coupled to the radio receiver to demodulate samples of the signals received at the receiver from each station to produce demodulated signals from each of the remote stations. The apparatus further includes a signal quality calculator coupled to the receiver to determine for each remote station from which data is received a measure of the received signal quality based on the samples of the received data from the remote station, and a transmitter to transmit data for transmission.

In one version, the signal quality measure is a measure of the EVM.

In one aspect of the invention, in the case that the received data is ascertained to include a request management message, the station responds to the request management message with a response management that include a measure of the EVM of received data corresponding to request management message. Thus, the remote station receiving the response management message receives an indication of the quality of the link between the station and the remote station without said receiving remote station necessarily being EVM-capable.

In one version, the wireless network substantially conforms to the IEEE 802.11 wireless networking standard. The request management message and the response management message are MAC frames.

In another aspect of the invention, a message to a particular remote station in response to the data received at the station from the particular remote station includes a measure of the EVM of the data received from the particular remote station. In one version, the wireless network substantially conforms to a wireless networking standard, e.g., one of the of the OFDM variants of the IEEE 802.11 standard, and a packet according to the wireless networking standard includes a header having a first field modulated at a known rate. The message to the particular station includes the measure of the EVM in the first field.

According to one version of the invention, the station selects one of the remote stations for communication according to a set of at least one criterion. The set includes the respective received signal quality measure determined by the signal quality calculator for data from each of the respective remote stations.

One application is when the selecting of one of the remote stations is for ad-hoc communication.

According to another application of the invention, in the case at least some of the remote stations from which data are received are access points, the station selects one of the access points for association according to a set of at least one criterion. The set includes the respective received signal quality measure determined by the signal quality calculator for data from each of the respective access points.

In one version, the signal quality calculator is an EVM calculator to determine for each remote station from which data is received a measure of the EVM of the received data from the remote station. The EVM is based on samples approximately at decision points of the demodulator. In a particular embodiment, the data received from remote stations that are access points include beacons or probe responses, such that one of the criteria for the station to select a remote access point for association is a measure of the EVM of a beacon or probe response received from the access point.

In another embodiment, one of the remote stations from which data is received is an access point with which the station is associated, such that the station decides whether or not to roam according to the measure of signal quality from data received from the remote access point with which the station is associated.

According to another aspect, the EVM of a beacon or probe response received from a remote access point is used to determine the maximum transmission rate that the link can support between the station and the remote access points, and wherein the determined maximum supported transmission rate is one of the criteria for the station to select a remote access point for association.

According to another aspect, the receiving station is an access point and in the case that the received data is ascertained to be a probe request, an association request or a reassociation request, a packet for transmission by the transmitter from the station to a particular remote station that sent the request includes a measure of the received signal quality of the request received from the particular remote station.

According to another aspect, the transmitter has a settable data rate, with the data rate set according to a data rate signal accepted by the transmitter. The apparatus further includes a data rate setting processor coupled to the signal quality calculator and to the transmitter and producing the data rate signal for the transmitter, the data rate signal set such that the data rate for transmission to a particular remote station is dependent on the measure of the signal quality produced by the signal quality calculator from signals received from the particular remote station.

Also described herein is a method embodiment in a station of a wireless network. The method includes wirelessly receiving data from at least one remote station. The data is transmitted by the remote station as at least one packet of data. The method further includes sampling the received data corresponding to the received packet to form data samples, demodulating the data samples, and determining a measure of signal quality from the samples of the received data.

According to one aspect, in the case that at least some of the remote stations are access points, the method includes selecting one of the access points for association according to a set of least one criteria including the respective determined received signal quality measure for data from each of the access points.

In one version, the determining of the measure of signal quality includes determining a measure of the EVM of the received data from received samples approximately at the decision points for demodulating the data.

According to another aspect, the method further includes selecting the data rate for communicating with the selected access point according to at least the determined measure of the EVM.

According to another aspect, the station is an access point, and the method further includes, in the case that the received data is ascertained to be a probe request or an association request for association or re-association, transmitting a packet to the particular remote station that sent the probe request or association request, the transmitted packet including an indication of the determined measure of the EVM of the packet received from the particular remote station.

According to another aspect, the method includes ascertaining whether the received data from any remote station is a request management message. In the case it is ascertained that a request management message was received from a particular remote station, the method includes responding to the request management message by transmitting to the particular remote station a response management message that include a measure of the EVM of received data corresponding to request management message. The particular remote station receiving the response management message receives an indication of the quality of the link between the station and the remote station without said receiving remote station necessarily being EVM-capable.

Another method embodiment described herein is a method in a station of a wireless network. The method includes wirelessly transmitting a request management message, wirelessly receiving data from at least one remote station, said data transmitted by the remote station as at least one packet of data, sampling the received data corresponding to the received packet to form data samples, demodulating the data samples, and ascertaining if the received data includes a response management message transmitted in response to a request management message.

If it is ascertained that the received data includes the response management message, the method ascertains if a packet has been received from the particular remote station that transmitted the response management message indicating a measure of the signal quality of the data remotely received at the particular remote station corresponding to the transmitted request management message. The message indicating the measure of signal quality can be used as an indication of the quality of communication achievable between the station and the particular remote station.

According to another aspect, if it is ascertained that such a packet has been received from the particular remote station, the method includes selecting whether or not to associate with the particular remote station according to at least the measure of the signal quality of the remotely received data.

In one version of the method, the determining of the measure of signal quality includes determining a measure of the EVM of the received data from received samples approximately at the decision points for demodulating the data.

In one embodiment, the determining of the measure of the EVM of the received packet includes determining the average of the squared Euclidian distance on the I,Q plane between decision-point samples of the signal received and the nearest ideal constellation points to the decision point samples.

In another embodiment, the determining of the measure of the EVM of the received packet includes determining the average of the squared Euclidian distance on the I,Q plane between decision-point samples of the signal received and the correct ideal constellation points for the signal as determined by demodulating the signal.

Other aspects of the invention will be clear from the detailed description, and the claims.

DETAILED DESCRIPTION

The invention is applicable to ad-hoc network configuration in which any station can communicate directly with another station, an to an infrastructure network configuration in which client stations communicate via an access point with which they are associated.

Described herein is a method for a station to select a station for communication, e.g., an access point for association in the infrastructure network case, using a measure of received signal quality to indicate of the data rate that the link between the station and the candidate AP can support. One embodiment includes calculating the received signal quality measure locally, and another includes measuring the received signal quality measure remotely.

One embodiment of the method uses a measure of the Error Vector Magnitude (EVM) on packets received from the candidate access point—or in the ad-hoc communication case, from the candidate partner for communication—to provide an indicator of signal quality. Another embodiment uses a measure of the EVM of packets from the station received at the candidate AP or communication partner.

The invention will be described in terms of a transceiver that operated according to OFDM variants of the IEEE 802.11 standard, including variants commonly known as 802.11a (approx. 5 GHz UNII band) and 802.11g (approx. 2.4 GHz) that support several data rates up to 54 Mbps, as well as future or proposed amendments to the IEEE 802.11 standard, such as what is being called the IEEE 802.11n variant for high throughput being studied (late 2003) by IEEE 802.11 Task Group N. The invention is also applicable to a radio that operated under any other wireless standard, including other variants in the IEEE 802.11 standard.

EVM is a modulation quality metric widely used in digital RF communications systems. It is typically defined for a transmitter or a receiver, and is the root-mean-square (RMS) value of the error vector over time for the signal at the correct symbol time. In the case of a receiver, the correct symbol times are approximated by the decision points—the times when demodulation decisions are made. The error vector is the vector length of the difference, in the complex plane (I,Q space) between an ideal constellation point of a symbol, and the actual constellation point of a symbol at the symbol time for the signal.

Figure 1:
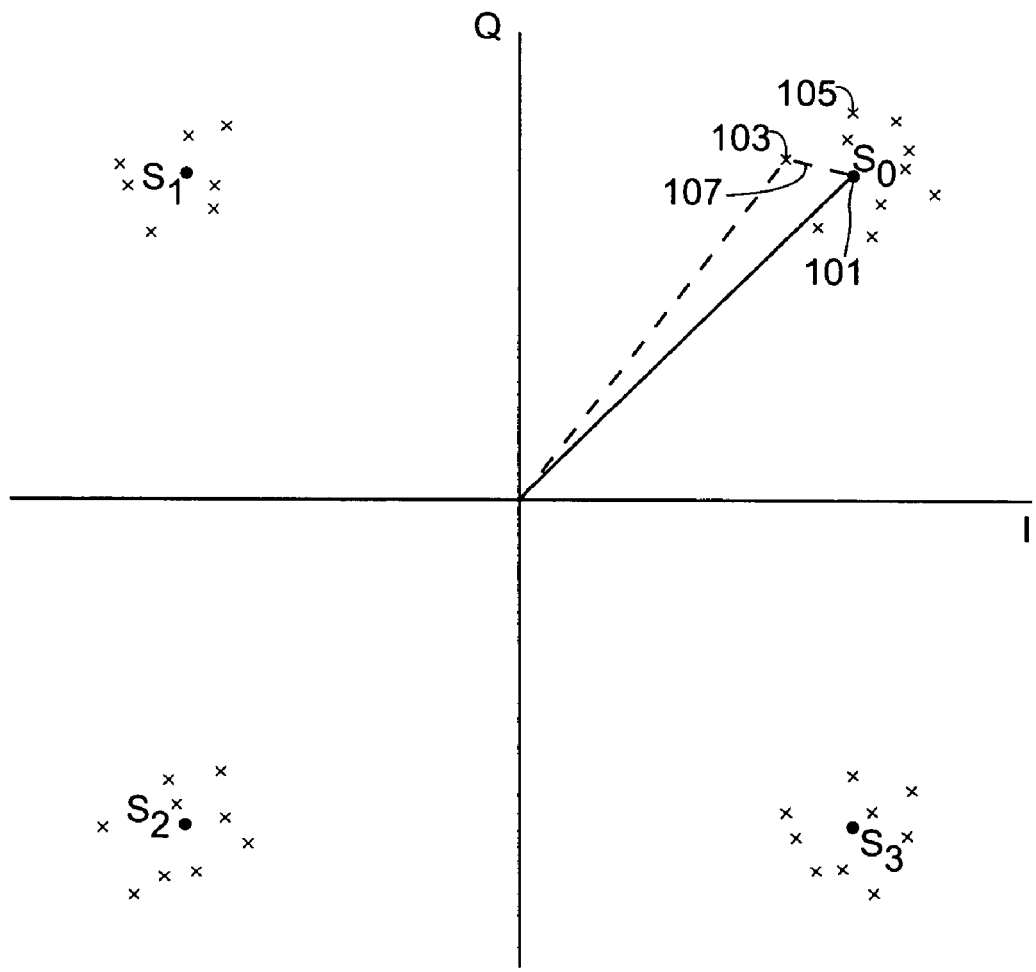
FIG. 1 shows an I,Q plane with a constellation of four possible symbols $S_0$, $S_1$, $S_2$, and $S_3$ for a signal that is modulated by a quarternary phase shift key (QPSK) modulation scheme.

Consider, for example, FIG. 1 that shows the constellation of the four possible symbols $S_0$, $S_1$, $S_2$, and $S_3$ for a signal that is modulated by a quarternary phase shift key (QPSK) modulation scheme. Ideally, each actual symbol at the symbol time falls on one of the four constellation points. In practice, because of phase error and/or magnitude error, the I,Q values for the modulated signal samples fall on points that are not exactly at the four ideal constellation points. FIG. 1 shows many such I,Q values, each indicated by an "X." Two such signal samples are shown as 103 and 105 near the $S_0$ constellation point 101. Consider point 103. The EVM is the mean of the square root of the square of the lengths—e.g., length 107—of the vectors that are the errors between the correct constellation point—e.g., constellation point 101—and the actual signal point—e.g., point 103. This quantity is normalized by the signal strength, so is expressed as a percentage (% RMS). Alternatively, it may be expressed in dB. When expressed in dB, the EVM is sometimes referred to as the relative constellation value.

Thus, a measure of the EVM in general varies monotonically with a measure of the distance squared between received symbols and ideal symbols, divided by the distance squared from ideal symbols to zero.

The measurement of EVM is somewhat complicated by carrier leakage that causes the origin of the IQ axes to shift.

One aspect of the invention is to use the EVM as a measure of the quality of the received signal. Used properly, EVM and related measurements can pinpoint exactly the type of degradations present in a signal and can even help identify their sources.

Figure 2:
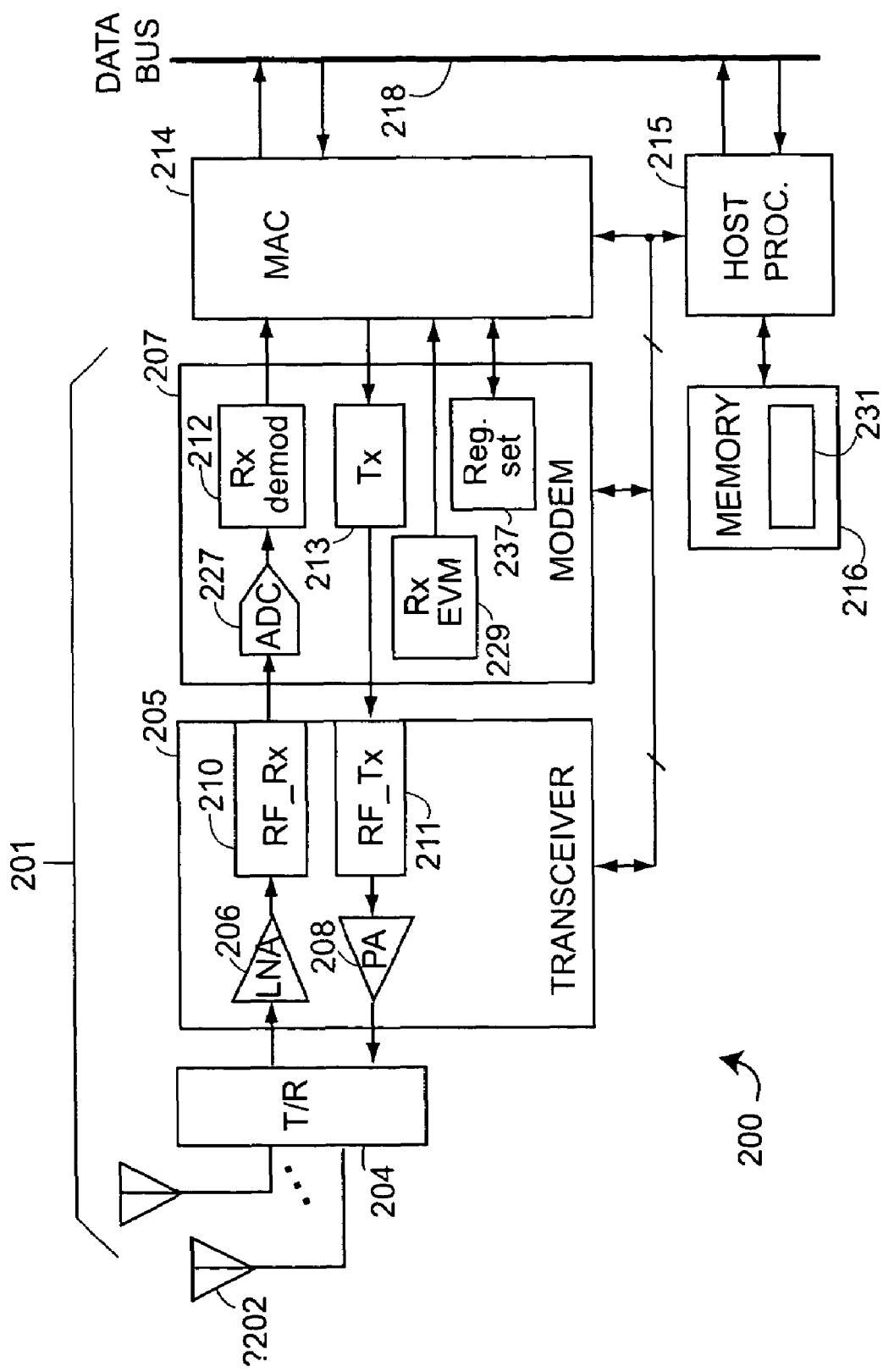
FIG. 2 is a functional block diagram of a wireless station that includes an embodiment of present invention.

FIG. 2 is a functional block diagram of a wireless station 200 that includes an embodiment of present invention. The station 200 may, for example, implement an AP or may implement a client station that desires to associate with an AP. The station 200 includes a physical layer interface (PHY) 201 that includes at least one antenna 202 for the frequency or frequencies of service (approx. 2 GHz and/or approx. 5 GHz), a transmit/receive (T/R) switch 204 for half-duplex operation, a wireless receiver that includes a low-noise amplifier (LNA) 206 and receiver radio frequency (RF) electronics 210, and a wireless transmitter that includes transmit RF electronics 211 and a power amplifier (PA) 208. The PHY also includes a modem 207 that includes a demodulator 212 and a modulator 213. The receive path to the demodulator includes an analog-to-digital converter (ADC) 227 to produce samples of the received signal. The system 200 further includes a medium access controller (MAC processor, or simply MAC) 214 for layer-2 processing. A computer system databus 218 is included in one embodiment, as is a host processor 215.

In one embodiment, a memory 216 is included for data buffering and program storage. The memory 216 may be directly coupled to the host or to the MAC or to both.

Alternate embodiments do not include the host processor. The host processor function may, for example, be incorporated with the MAC 214.

In addition to the payload data between the modem 207, radio transceiver 205, and MAC 214, control information such as gain settings for the radio receiver from an automatic gain control module in the modem 207, and other data is communicated between the transceiver and the modem. Furthermore, other data may be communicated between the modem and the MAC, and between the modem and the host (if included).

A set of registers 237 is included. In one embodiment, the MAC processor 214 has access to at least some of the set of registers 237. Some registers can be loaded with data from the MAC 214, others provide data for the MAC processors, while some may provide for two-way communication.

In one embodiment, the modem 207 includes a signal quality calculator 229 that determines a measure of the received signal quality from samples of the received signal.

One embodiment of the signal quality calculator 229 is an EVM calculator that determines a measure of the EVM for a received packet or part thereof, and communicates the EVM measure to the MAC.

In one embodiment, the EVM is provided in a pair of registers of the register set 237. The pair of registers is used for the numerator and denominator, respectively, of the determined EVM measure.

Some embodiments may use antenna diversity, e.g., two or more transmit antennas or two or more receive antennas or multiple antennas for both receiving and transmitting. The diversity may be provided by spatial diversity, or by having different polarizations at the antennas, and so forth. The antennas may be switched or combined. Such processing is known to improve performance in environments that include fading, and may even be used to provide spatial division multiple access (SDMA).

One embodiment of system 200 is compatible with one or more variants of the EEE-802.11 standards for wireless local area network (WLAN) applications. The RF transceiver 205 and modem 207 constitute a complete wireless engine for layer-1 physical layer (PHY) functionality for one or more of the IEEE-802.11 PHY variants, and the MAC 214 is IEEE-802.11-compatible.

One embodiment of the system 200 preferably is constructed on a single printed circuit board (PCB). The RF transceiver 205 and modem 207 are each implemented with CMOS technology in individual integrated circuits (chips).

The OFDM Receiver

One embodiment of the invention is applicable to communicating using OFDM packets that conform to the IEEE 802.11 OFDM variants. Such an OFDM packet starts with a preamble. The preamble provides for start of packet (SOP) detection, automatic gain control (AGC), diversity selection when diversity is used, various other synchronization functions, and channel estimation. The preamble is followed by the modulated payload, which starts with a known (low) data rate SIGNAL field that provides information about the packet, including the data rate at which the rest of the packet in encoded. The SIGNAL field is followed by DATA fields at a rate specified in the SIGNAL field. Each data field includes a guard interval (cyclic extension). The SIGNAL field includes information on the data rate (RATE). The RATE information determines the coding rate and the modulation method used according to the following Table 1:

TABLE 1

Modulation type for IEEE 802.11 OFDM packets

| Rate (Mbps) | Modulation type | Coding rate |
| --- | --- | --- |
| 6 | BPSK | ½ |
| 9 | BPSK | ¾ |
| 12 | QPSK | ½ |
| 18 | QPSK | ¾ |
| 24 | 16-QAM | ½ |
| 36 | 16-QAM | ¾ |
| 48 | 64-QAM | ⅔ |
| 54 | 64-QAM | ¾ |

One embodiment further includes several proprietary modulation additional data rates that do not conform to the IEEE 802.11 standard.

Figure 3:
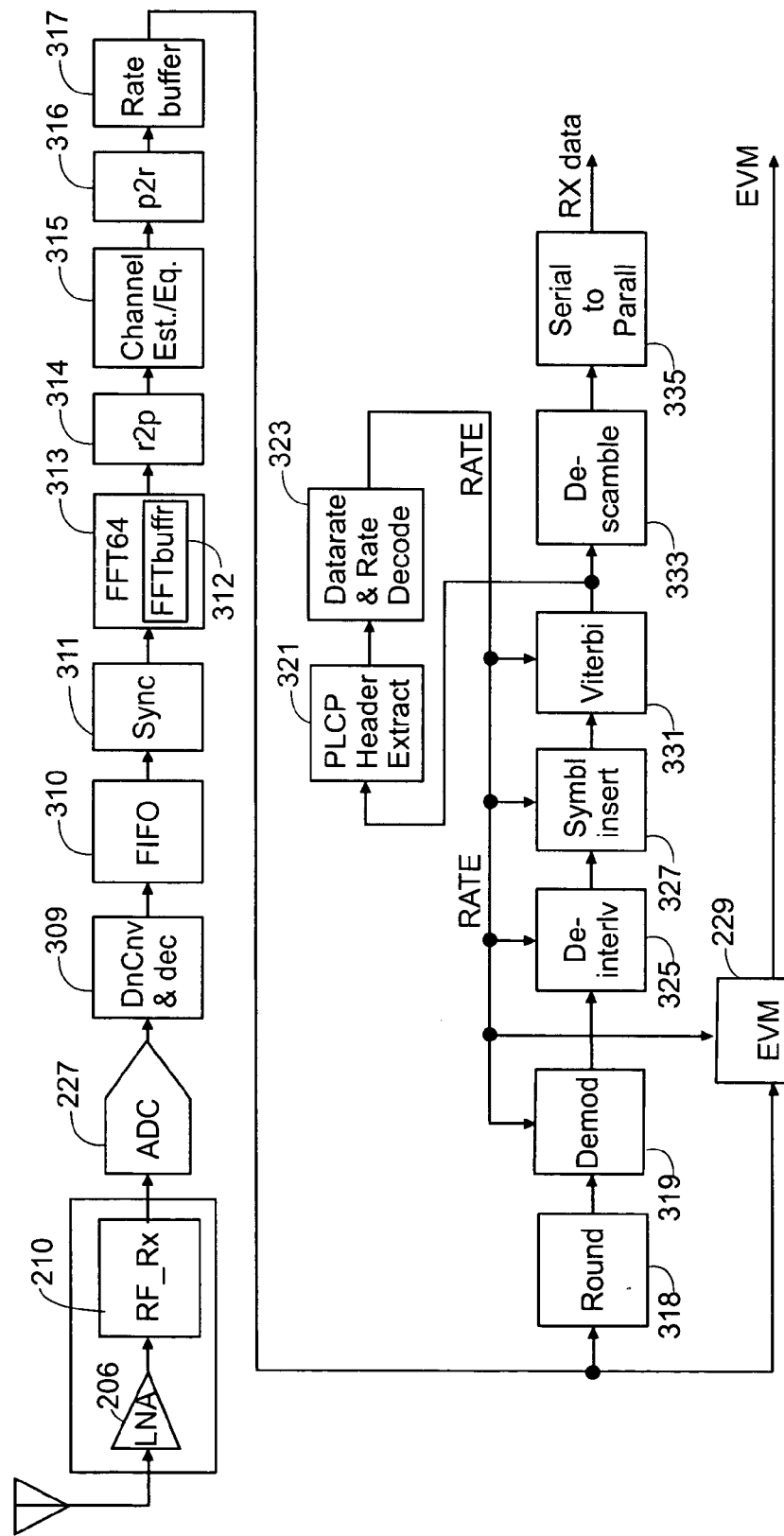
FIG. 3 shows a simplified block diagram of the OFDM receiver part of the modem shown in FIG. 2 according to one embodiment of the present invention.

FIG. 3 shows a simplified block diagram of the OFDM receiver part of the modem 207. The embodiment shown works with a version of the receive RF electronics 210 that produces an IF signal with a 20 MHz bandwidth requiring further down-conversion to obtain baseband I,Q signals. The analog IF signal from the receive RF electronics 210 may be set to be centered at a settable frequency between 20 MHz and 25 MHz, e.g., at 20 MHz. An ADC 227 digitizes the analog received signals. Element 309 further down-converts and decimates the signals to produce I and Q samples that enter a first in first out (FIFO) buffer 310 and a time synchronization unit 311. Synchronization is achieved by one or more methods, such as estimating the short preamble's short symbol timing using a correlator and estimating the guard interval timing of the long preamble. The synchronization unit further includes frequency estimation and frequency correction using a rotator. The output of the rotator is presented to a 64-sample input buffer 312 of a 64-sample discrete Fourier transformer 313 (FFT64) for time-to-frequency conversion.

The Fourier transformer 313 transforms the complex baseband time-domain samples of the OFDM symbols of the received packet into complex-valued frequency domain samples by a Discrete Fourier Transform (DFT) operation. The IQ frequency domain samples from Fourier transformer 313, in bit-reversed frequency order, are converted to polar coordinates by a rectangular-to-polar (amplitude/phase) converter 314—a cordic in one embodiment. The result is input into a channel response estimator/equalizer block 315 that estimates the channel response and that equalizes the signals according to the estimated channel response. Also included in estimator/equalizer block 315 are a channel state information detection circuit and a pilot tone correction unit. The corrected signals are converted back to I,Q (rectangular coordinate) form by a second coordinate converter 316. The output is thus a sequence of IQ frequency samples ready for demodulation.

A rate buffer 317 is included between the second coordinate converter 316 and a demodulator 319. The rate buffer 317 is a second FIFO which buffers the received frequency samples from the end of the SIGNAL field for a number clock cycles equal to the latency (in clock cycles) through the later parts of the receiver needed for processing the SIGNAL field, including demodulating and decoding. The rate buffer block 317 is included because the SIGNAL field, which is always transmitted as a 6 Mbps rate ½ binary phase shift key (BPSK) signal, determines the modulation type and coding rate of the remainder of the packet, shown as RATE in FIG. 3. This information is then used to set up the demodulator and Viterbi decoder parameters before the remainder of the packet is input into the demodulator chain. Hence, the remainder of the packet needs to be buffered until at least the RATE information has been successfully decoded.

The output samples (I,Q) of the rate buffer are demodulated by the demodulator 319. In one embodiment, the samples are first rounded from 12-bits for each of I and Q to 6 bits for each by a rounder 318. The demodulator 319 demodulates depending on the modulation specified by the RATE. The demodulated symbols from demodulator 319 are de-interleaved by interleaver 325 and symbols inserted in symbol inserter 327 to ensure the symbols have the coding rate to match the decoder included in this one embodiment. The output symbols of symbol inserter 327 are input to a Viterbi decoder 331 and descrambled by descrambler 333. The de-interleaving, symbol insertion, and Viterbi decoding depend on the RATE. The series of descrambled symbols are converted to parallel form by serial-to-parallel converter 335 for input to the MAC processor.

Initially, the demodulator, de-interleaver, decoder, etc. are set to process the SIGNAL field. Once the RATE information, including the modulation scheme, is determined, these elements are set to demodulate the data frames of the payload. In this embodiment, the Viterbi decoder 331 is a ½-rate decoder.

The symbol inserter 327 is included to insert dummy signals to convert non-½ data into data suitable for the Viterbi decoder 331.

The receiver generates the received data of a packet and passes the data to the MAC processor 214. Additional information also is passed on to the MAC layer processor, including information about the packet. In one embodiment, such information includes a measure of the EVM of the SIGNAL part, a measure of the EVM of the data part of the packet, and the RSSI.

The receiver includes an EVM calculator 229 coupled to and accepting input from the rate buffer, i.e., accepting I,Q samples at the decision points. The EVM calculator determines a measure of the EVM of the OFDM symbols in the packet. The EVM determination depends on the ideal constellation points for the particular modulation type. Hence, EVM calculator 307 also accepts RATE information.

A measure of the EVM is calculated by EVM calculator 229 and passed on to the MAC layer processor 214. In one embodiment, the measure is passed to the MAC as a numerator and denominator. In one embodiment, once the SIGNAL field is processed, data is passed on to the MAC processor for further processing according to the appropriate MAC protocol.

In one embodiment, the EVM measure for the SIGNAL part and the EVM measure for the data part of each arriving packet are separately communicated to the MAC processor.

We call a station that includes an EVM calculator an EVM-capable station. According to an aspect of the invention, a station uses a measure of the EVM as a measure of the signal quality as one of the criteria for selecting an AP for association or, in the ad-hoc communication case, another station—the communication partner—for communication. An aspect of the invention is embodied in an EVM-capable station as a method for that station to select a remote, not-necessarily-EVM-capable station for communication, e.g., AP for association. Another aspect of the invention is embodied as a method in an EVM-capable station that sends EVM information to another not-necessarily-EVM-capable station. Another aspect of the invention is a method embodied in a not-necessarily-EVM-capable station that receives the EVM data from an EVM-capable station.

Another aspect of the invention is that the EVM is used to provide information to the transmitter part of the modem 207 on what rate to use to send data to the station from which the data is being received.

One definition of the EVM of an OFDM packet (or parts of a packet) of length $L_p$ using 52 sub-carriers (including pilot tones) is:

$$EVM_{RMS} = \sqrt{\frac{\sum_{j=1}^{L_p}\left\{\left|\sum_{k=1}^{52}[(I(j,k) - I_0(j,k))^2 + (Q(j,k) - Q_0(j,k))^2]\right|\right\}}{52 L_p \times P_0}}$$

where $I_0(j,k)$ and $Q_0(j,k)$ denote I,Q for an ideal symbol point of the j'th OFDM symbol of the packet, and k'th sub-carrier of the symbol in the complex I,Q plane, $I(j,k)$ and $Q(j,k)$ denote the received I,Q values of the j'th OFDM symbol of the packet, and k'th sub-carrier of the symbol in the complex I,Q plane, and $P_0$ denotes the average power of the constellation.

The EVM calculator 229 is used to calculate a measure of the EVM, e.g., a function of the calculated EVM, $EVM_{calc}$ according to the following formula:

$$f(EVM_{calc}) = \frac{\sum_{j=1}^{L_p} \left\{ \sum_{k=1}^{48} [(I(j,k) - I_n(j,k))^2 + (Q(j,k) - Q_n(j,k))^2] \right\}}{48 L_p \times P_0}$$

where there are 48 subcarriers—the 52 subcarriers but without the pilot tones, $f$ is the function of the EVM determined and $I_n(j,k)$ and $Q_n(j,k)$ denote the I,Q values of the nearest for an ideal symbol point to the actual I,Q values of the j'th OFDM symbol of the packet, and k'th subcarrier of the symbol in the complex I,Q plane. In one embodiment, the numerator and denominator of $f(EVM_{calc})$ as defined above are determined by the EVM calculator 229 and passed to the MAC processor for determination of $f(EVM_{calc})$, the measure of the EVM. In one embodiment, $f(EVM_{calc})$ is the square of $EVM_{calc}$, the calculated EVM. The EVM calculator 229 determines the nearest neighbor decision point using a hard decoder. Because of the use of a hard decoder, using this measure of the EVM may lead to errors, e.g., having a higher signal quality than the actual signal quality. Such errors are especially possible when the actual EVM is large, e.g., at high data rates when the quality of the signal is relatively low. Determining the EVM according to the Euclidean distance in the I,Q plane to the nearest ideal constellation point is however less complex than determining the distance to the correct ideal constellation point.

In an improved embodiment, the EVM calculator is also coupled to the demodulator and determined a measure closer to the true EVM than the nearest neighbor embodiment. Once the signal is demodulated, the ideal I,Q values for the demodulated signal, e.g., of a reference signal modulated by the decision points, are determined and the measure of EVM determined by EVM calculator 229 is according to the Euclidean distance in the I,Q plane to the correct ideal constellation point according to the demodulation. In particular, the improved embodiment EVM calculator determines:

$$f(EVM_{calc\_improved}) = \frac{\sum_{j=1}^{L_p} \left\{ \left| \sum_{k=1}^{48} [(I(j,k) - I_0(j,k))^2 + (Q(j,k) - Q_0(j,k))^2] \right| \right\}}{48 L_p \times P_0}$$

where again there are 48 subcarriers—the 52 subcarriers but without the pilot tones, $f(EVM_{calc\_improved})$ is the function of the calculated EVM according to the improved method, and $I_0(j,k)$ and $Q_0(j,k)$ denote the I,Q values of the ideal symbol point.

Selecting Another Station for Communication, e.g., an AP for Association

According to one aspect of the invention, each STA such as STA 200 maintains a database of the beacons and probe responses it receives. Beacons and probe responses are stored in the database under one or more circumstances, e.g., when the STA determines whether or not to associate with an AP. In the context of aspects of the present invention, beacons and probe responses received at the STA are stored in the database after an active scan or a passive scan. We call this database the Beacon Table. As shown in FIG. 2, in one embodiment, the Beacon Table 231 is in the memory 216 of the STA. Other embodiments store the Beacon Table 231 outside of memory 216. A STA stores the information in the beacons and probe responses in its Beacon Table 231, and further stores additional information about the state of the STA when it receives the beacon.

Another embodiment described below, in addition to information from beacons and probe responses, information on any packets from remote stations, even those directed to other, third-party stations is recorded. See below for the case that the station is EVM-capable and maintains information, including the EVM of received packets from any station it can hear.

Selection by an EVM-Capable Station

By an EVM-capable station is meant a station that includes a signal quality calculator in its PHY processor that calculates the quality of a received signal. One implementation of such an EVM-capable station is STA 200 of FIG. 2, wherein the signal quality calculator calculates the EVM of data received from a remote station.

Figure 5:
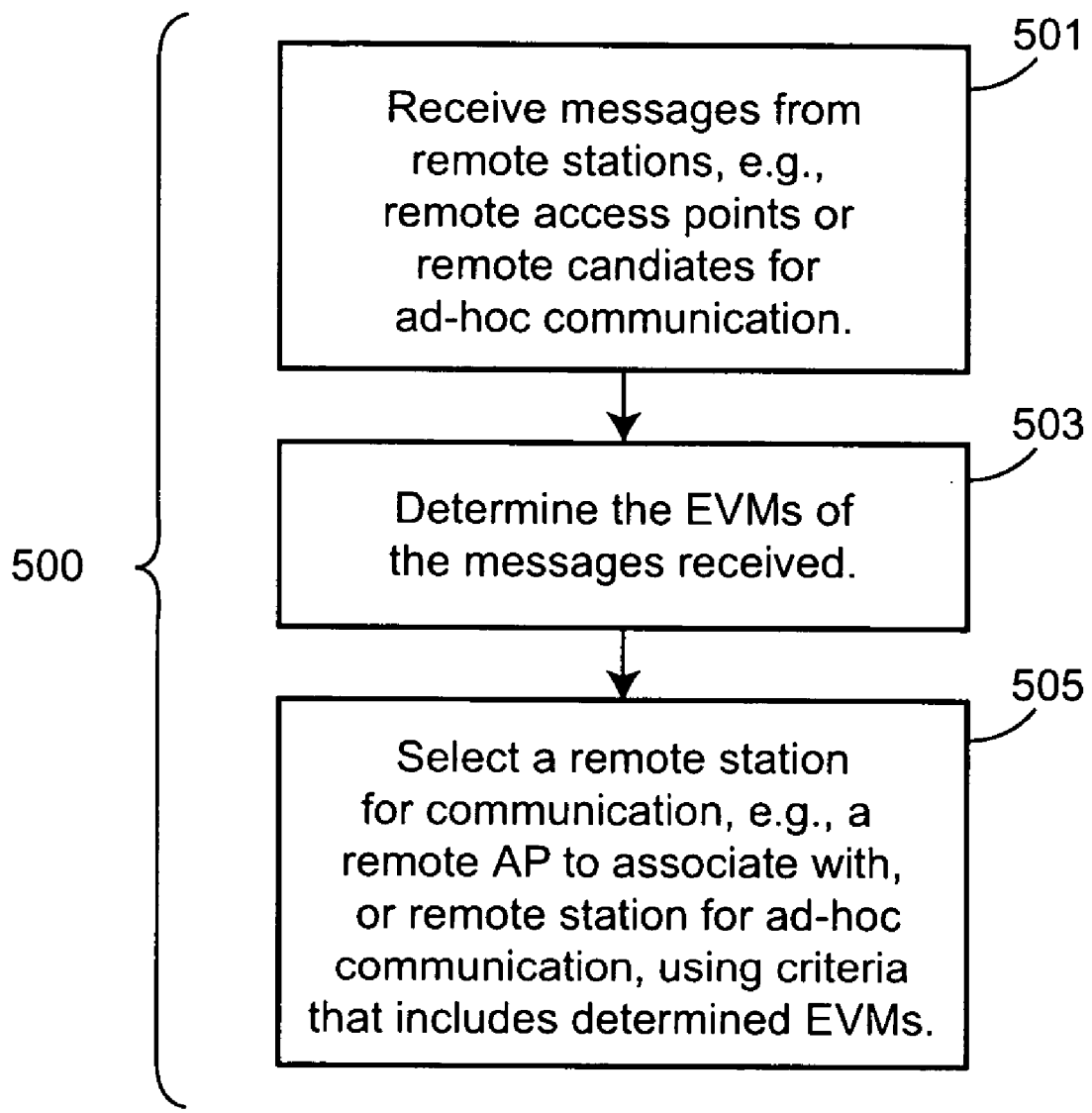
FIG. 5 shows a flow chart of an embodiment of a method implemented on an EVM-capable station of selecting an access point for association.

One aspect of the invention is an EVM-capable station that selects a remote station for communication, e.g., access point for association or another station for ad-hoc communication, according to a measure of the signal quality, in particular, of the EVM of data received from the remote station, e.g., remote access point. Thus, one embodiment is a method in an EVM-capable station of a wireless network. FIG. 5 shows a simplified flowchart of the method 500. The method includes (step 501) wirelessly receiving data from at least one remote station, the data transmitted by the remote station in packets, sampling the received data corresponding to the received packet to form data samples, demodulating the data samples, and determining (step 503) the EVM from the samples of the received data.

In the case that at least some of the remote stations are access points, the method includes (step 505) selecting one of the access points for association according to a plurality of criteria, including the respective determined received signal quality measure for data from each of the access points.

In the case that the candidate remote stations are for ad-hoc communication, the method includes (step 505) selecting one of the access points for communication according to a plurality of criteria, including the respective determined received signal quality measure for data from each of the candidate remote stations.

The remote station, e.g., access point need not itself be EVM-capable.

In one embodiment, the packets received from the remote access points are beacons or probe responses, such that one of the criteria for the station to select a remote access point for association is a measure of the EVM of a beacon or probe response received from the access point.

The EVM of received data corresponding to at least part of the beacon or probe response received from a remote access point is used to determine the maximum transmission rate that the link can support between the station and the remote access points. Thus, the determined maximum supported transmission rate is one of the criteria for the station to select a remote access point for association.

Another embodiment uses the EVM of a response to an association or reassociation request to determine whether to roam to another access point. An EVM-capable station selects an access point for association or reassociation and issues an association or reassociation request message, e.g., an association or reassociation request MAC frame. The remote access point responds with an association or reassociation response message, e.g., an association or reassociation MAC frame. The EVM of signals corresponding to data in the association or reassociation response message received from the remote access point is used to determine whether or not to seek another access point for association.

According to yet another embodiment, the EVM from any frame received by an EVM capable station from a remote access point with which the station is associated determines a roam.

According to one aspect of the invention, each STA such as STA 200 maintains a database of the packets it receives from any remote station. In the case the packets are beacons and probe responses it receives, the beacons and probe responses are stored in an AP database. One embodiment, in addition to information from beacons and probe responses, stores information on any packets from remote stations, even those directed to other, third-party stations is recorded. One item of information stored is the EVM of received packets from any station it can hear. Such information can then be used for selecting a database for association or reassociation.

Selection by a Not-necessarily-EVM-capable Station

Another aspect of the invention is a station that is not necessarily EVM-capable selecting a remote access point for association using a measure of the EVM of data received via the link.

Figure 6:
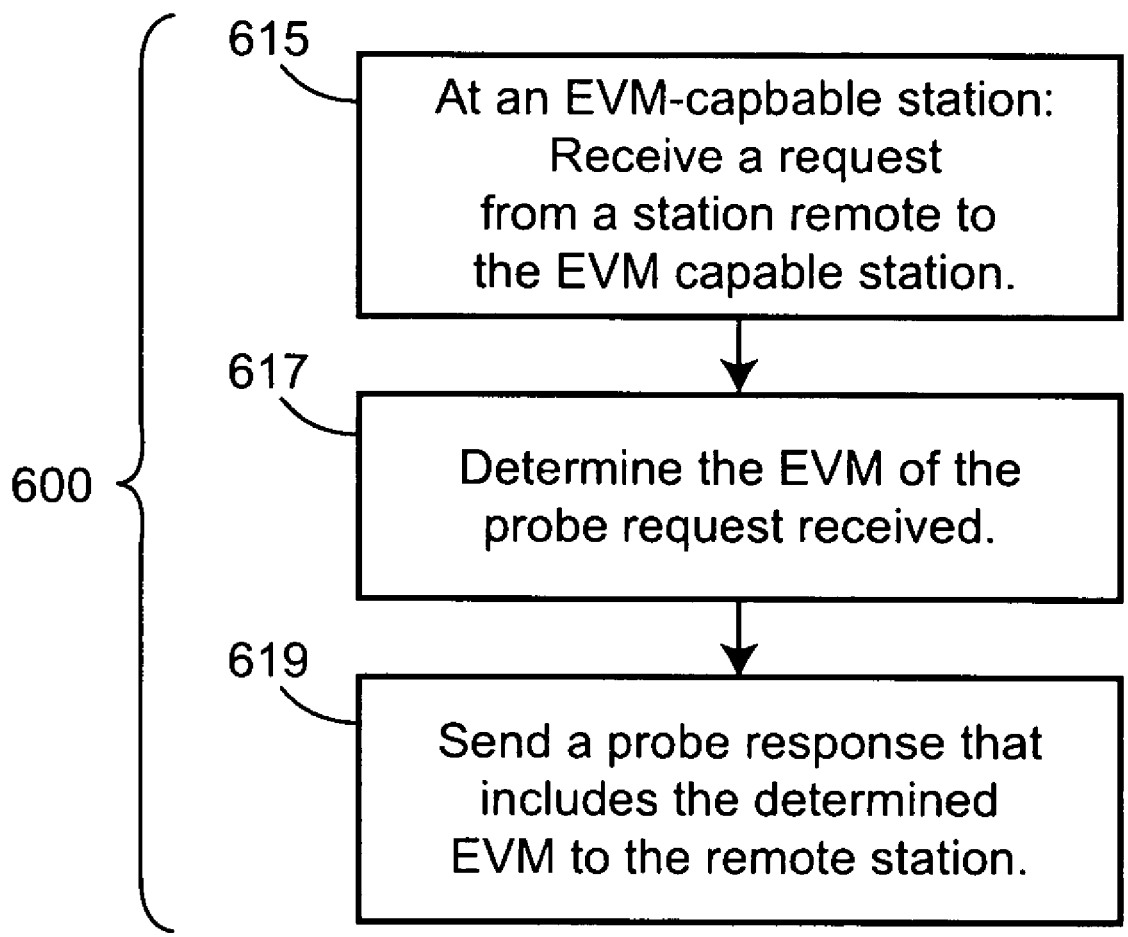
FIG. 6 shows a flow chart of an embodiment of a method implemented on an EVM-capable access point receiving a probe request and responding with a probe response that includes a measure of the EVM of the received probe request.

One embodiment of the method implemented at the not-necessarily EVM-capable station includes the not-necessarily EVM-capable station receiving a measure of the EVM of data received via the link from a remote access point that is EVM-capable. FIG. 6 shows a embodiment 600 of the method implemented at an EVM-capable station, such as an access point or a potential candidate for ad-hoc communication. The embodiment includes the EVM-capable station—e.g., access point—receiving a request message, e.g., a message from a remote station requesting association or reassociation, or a probe request message from a remote station, and responding to the received request message with a response message that includes an indication of the received signal quality from samples of the request message. The case shown in FIG. 6 is that in step 615, a request is received. In step 617, the EVM-capable station calculates a measure of the EVM from the request, and in step 619, the EVM-capable station responds to the sending station with a response that includes the determined EVM.

The not-necessarily EVM-capable station selects whether or not to communicate with the remote EVM-capable station, e.g., whether or not to associate with the remote access point or whether or not to communicate with the remote EVM-capable station on an ad-hoc basis, according to the received measure of signal quality, e.g., the EVM of the link sent by the remote EVM-capable station. Such selection, for example, may include selecting from a plurality of available remote stations, e.g., remote access points.

Another aspect of the invention includes modifying the existing MAC frame structure to include the EVM measure in a probe response, an association response, and a reassociation response MAC frame so that an EVM-capable station can send a measure of the EVM to a remote station from which the EVM-capable station received a signal. The modified MAC structure includes an indication of whether or not the frame includes an indication of the EVM so that a station receiving the frame can ascertain whether or not the received frame is from an EVM-capable station, and thus includes a measure of the EVM.

Thus, in the infrastructure network application, a not necessarily EVM-capable station receiving a beacon from a remote access point can send out a probe request and receive in response a probe response from the remote access point. In the case that the remote access point is EVM-capable, the probe response includes a measure of the EVM of data from that station remotely received at the remote access point. Thus, one aspect includes the station ascertaining if the probe response is from an EVM-capable station, and thus would include the measure of the EVM. The station then selects whether or not to associate with the remote access point according to the received measure of the EVM. In practice, the station may select from a set of remote access points from which the station has received such EVM measures.

In an alternate implementation, again for the infrastructure network application, a not necessarily EVM-capable station receiving a beacon from a remote access point can send out an association request and receive in response an association response from the remote access point. In the case that the remote access point is EVM-capable, the association response includes a measure of the EVM of data from that station remotely received at the remote access point. Thus, one aspect includes the station ascertaining if the association response is from an EVM-capable station, and thus would include the measure of the EVM. The station then selects whether or not to reassociate with a different station in the case EVM measure is below a settable threshold, or in the case that the EVM measure is significantly lower than that from one or more other remote access points from which the station has received such EVM measures.

An alternate implementation introduces new MAC management frames that are measurement frames. One such frame is a measurement request MAC frame. An EVM-capable station responds to a measurement request MAC frame with a response management MAC frame that includes an indication of the signal quality, e.g., the EVM of the signal corresponding to at least part of the measurement request MAC frame.

Thus, in the case of an infrastructure network, a station sends out a measurement request MAC frame to an AP, e.g., one that responded to a probe request with a probe response MAC frame An EVM-capable station responds to the measurement request MAC frame with a response management MAC frame that includes an indication of the signal quality, e.g., the EVM of the signal corresponding to at least part of the measurement request MAC frame. The station may now select whether or not to associate with the remote AP based on an indication of the received signal quality at the AP.

Note that while the above describes the case of a not-necessarily EVM-capable station deciding whether or not to associate with an EVM-capable access point, the method is equally applicable to the case of a not-necessarily EVM-capable station deciding whether or not to select an EVM-capable remote station—not necessarily an access point—for communication, e.g., on an ad-hoc basis. Those in the art will be able to modify the method described above for the case of the not-necessarily EVM-capable station receiving a packet from an EV-capable remote station that includes a measure of the signal quality, e.g., of the EVM, of data received a the remote station from the not-necessarily EVM-capable station.

A Two Way Measure

It may be that the link between a station and a remote station is not perfectly symmetrical, such that a measure of the signal quality of packets received from a remote station would not be the same as an identically determined measure of the signal quality of packets received at the remote station. For example, the receivers or transmitters at each end of the link may be different, e.g., have substantially different specification and capabilities.

An improved embodiment of the invention is applicable when both the station selecting an access point for association and the remote access point are EVM-capable. The selecting is according to a measure of the EVM of data received via the link. In the improved embodiment, a two-way measure is used. Thus, an EVM-capable station received a measure of the EVM of signals from the station received at a remote access point, for example, using the MAC frames described above. The station further uses its own EVM calculator to determine the EVM of data received from the remote access point. The station now selects whether or not to associate with the remote access point according to the two EVM measures in each direction of the link between the station and the remote access point.

Figure 7:
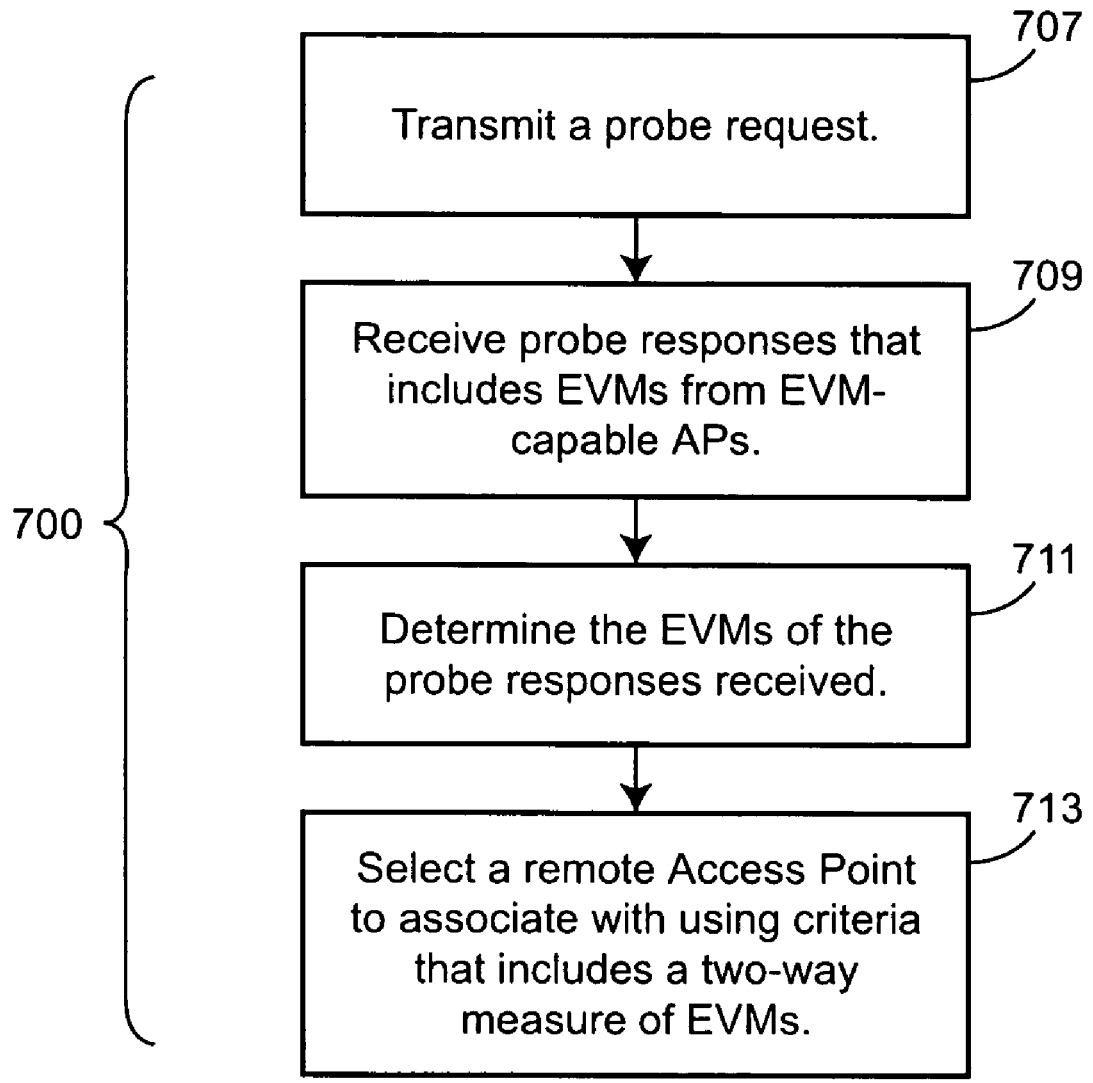
FIG. 7 shows a flow chart of an embodiment of a method implemented on an EVM-capable station sending a probe request to an access point and receiving a probe response.

FIG. 7 shows a flow chart of an embodiment 700 of the method, including a station sending (step 707) a probe request to a remote AP. The AP is EVM capable and responds (see FIG. 6) with a probe response that includes a measure of the EVM from the received probe request. The station in a step 709 receives the probe response that includes the EVM measure. In a step 711, the station determines a measure of the EVM of signals corresponding to the received probe response. In a step 713, the station selects whether or not to associate with the AP (or to associate with a different AP) based on the EVM in both directions of the link.

Again, while the above shows the case of a station selects whether or not to associate with an AP, the invention is also applicable to the case of a station deciding whether or not to communicate on an ad-hoc bases with another station.

Response by an EVM-Capable Station

According to one aspect of the invention, an EVM-capable station responds to management MAC frames that are requests with response management MAC frames that include EVM information as well an indication that such EVM information is included. The EVM-capable station communicates information about the received requests using MAC frames that conform to a modification of the IEEE 802.11 standard MAC protocol. For example, according to an aspect of the invention, a standard MAC frame used for responding to an association request or a reassociation request, i.e., an association response or reassociation response frame, includes in addition to information specified in the IEEE 802.11 standard, information on the EVM of the received association request or reassociation request, and an indication that the association response or reassociation response frame contains such EVM information. Furthermore, according to another aspect of the invention, a standard MAC frame used for responding to a probe request, i.e., a probe response frame includes in addition to information specified in the IEEE 802.11 standard, information on the EVM of the received probe request and an indication that the probe response frame contains such EVM information.

An alternate implementation introduces new MAC management frames that are measurement frames as described above. One such frame is a measurement request MAC frame. An EVM-capable station responds to a measurement request MAC frame with a response management MAC frame that includes an indication of the signal quality, e.g., the EVM of the signal corresponding to at least part of the measurement request MAC frame.

Acceptance of the EVM Information by the MAC in an EVM-capable Station

Referring again to FIG. 2, the modem 207 forms the data for the MAC processor 214. One embodiment of the modem 207 operates in two modes we call PSDU (for PLCP Service Data Unit) mode (PCLP is the physical layer convergence protocol) and PPDU (for PLCP Protocol Data Unit) mode, respectively. In PSDU mode, only packet payload data is transferred to the MAC processor 214. All receive packet header information is available to the MAC processor 214 in the register set 237 of the modem 207. In the case of an EVM-capable station at least one of the register set 237 includes the EVM of data received. In PPDU mode, the PPDU data, such as the PLCP header data, is also sent to the MAC processor 214, and such data is sent to the MAC processor once it is decoded.

Figure 4:
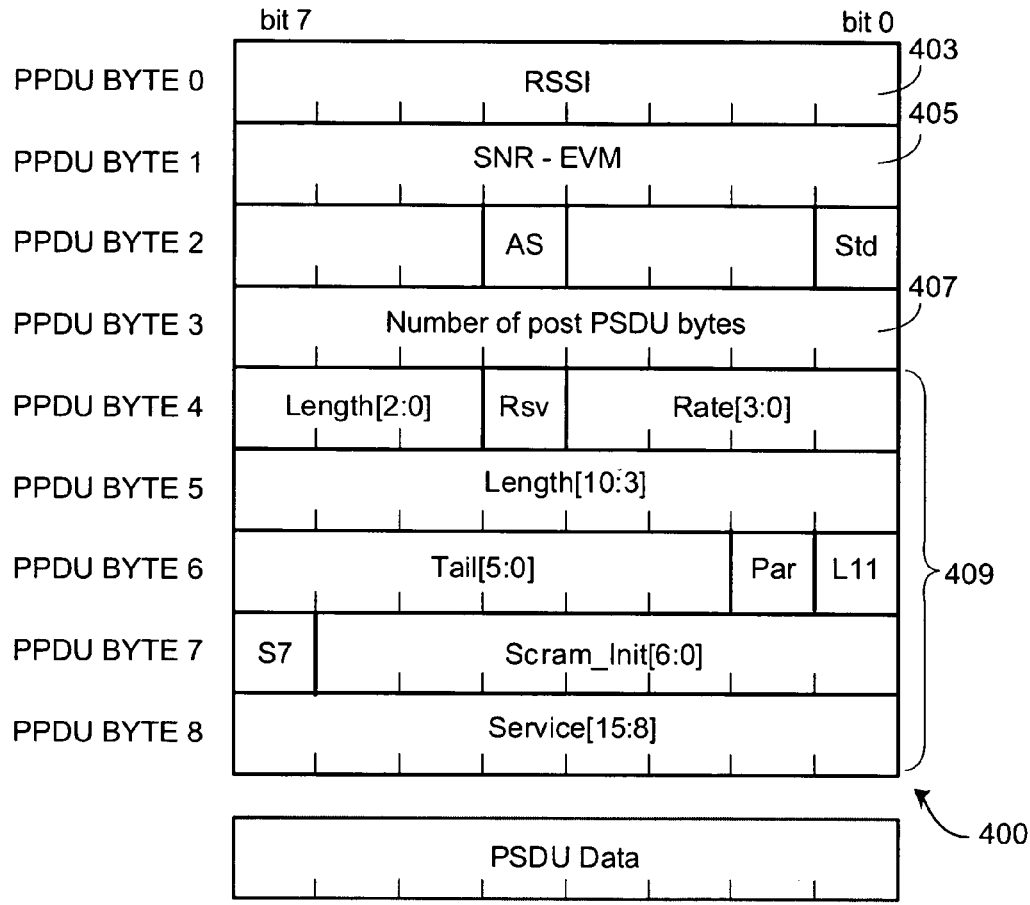
FIG. 4 shows the order of data transmitted to the MAC processor in the case that the data is OFDM data and that PPDU mode is enabled, according to one embodiment of the invention.

FIG. 4 shows the order of data transmitted to the MAC processor 214 in the case that the data is OFDM data and that PPDU mode is enabled. In one embodiment, a total of nine bytes 400 are sent before the PSDU data. The byte 403 provides the received power at the receiver for the packet, in particular, the received signal strength indication—the RSSI—at the receiver of transceiver 205 for the packet. The next byte, byte 405 provides a measure of the signal quality for the SIGNAL field. In one embodiment, this is the EVM calculated by EVM calculator 229. The next byte contains an indication of the antenna used, the standard (802.11a,g OFDM or 802.11b DSSS/CCK), and other information related to the DSSS/CCK case. One embodiment also provides for sending some additional information after the PSDU data, e.g., for debugging. The next (fourth) byte 407 indicates to the MAC the number of post PSDU bytes that are to be included. This is followed by the five-byte PLCP header 409 itself (for the OFDM case). The PSDU data follows.

In one embodiment, the MAC processor retrieves information contained in each received packet identifying the particular remote station the packet is from and maintains two metrics for each remote station in communication with the station. The two metrics maintained at the MAC are the EVM measure of the last packet from the remote station, and a running average of the EVM measures over a number, say the last N packets from that remote station. For example, in the case of an access point, the MAC maintains two metrics for each associated station. In one embodiment, the MAC processor also maintains the metrics on a set of presently unassociated but previously associated stations.

Again, while one application described is ascertaining at a station whether the station associates or reassociates with an access point, an alternate embodiment is applicable to ad-hoc communication: ascertaining at a station whether the station communicates with another station on an ad-hoc basis.

Selecting the Initial Rate

In one embodiment, when a station receives a packet from a remote station, the latest EVM from the remote station is used to select the initial rate for communicating with that remote station.

The MAC processor 214 includes a memory that stores a table of data rates and the EVM range for such a data rate.

In the case that the remote station successfully receives the response transmitted at the initial selected rate, communication continues at that rate. In the case that the remote station does not successfully receive the response, the initial rate is lowered until communication is successful.

Compared to the prior art method of iterating starting at the highest rate, fewer iterations should be needed before either successful communication is achieved, or it is ascertained that no communication is possible.

ALTERNATE EMBODIMENTS

Access Point Selection According to a Plurality of Metrics

In another embodiment, the set of criteria for selecting an access point for association is according to a measure of the EVM between the station and the remote station, and also from one or more other metrics available to the MAC. In one embodiment, one such metric is the packet error rate (PER) for packets from the remote station. For example, in an EVM-capable station, if the EVM from a remote station that is a candidate for association indicates a high signal quality, but the PER for packets for packets received is high, e.g., indicating a poor receiver, the station may determine that the maximum supported data rate is lower than that indicated only by the EVM. This may lead to selecting a different access point for association.

In another embodiment, one of the other metrics used is the carrier-to-noise ratio (CNR) at the PHY. U.S. patent application Ser. No. 10/698,703 titled "INITIAL TIMING ESTIMATION IN AN WIRELESS NETWORK RECEIVER to inventors Hart et al., filed Oct. 31, 2003, and assigned to the assignee of the present invention, describes how the CNR of a packet may be estimated from an average power measure determine from samples of the received data after a start-of-packet indication and from an average power measure determine from samples of the received data before such a start-of-packet indication. Such U.S. patent application Ser. No. 10/698,703 is incorporated herein by reference.

In yet another embodiment, one of the other metrics used is the bit-error-rate (BER) at the receiver.

In yet another embodiment, the receiver includes a filter in the receive path, and provides a measure of the RSSI both pre-filter and post filter. Comparing the pre- and post-filter signal strengths provides a measure of the amount of adjacent channel interference. See U.S. patent application Ser. No. 10/622,175 now U.S. Pat. No. 7,212,798 titled "ADAPTIVE AGC IN A WIRELESS NETWORK RECEIVER," filed Jul. 17, 2003 to inventors Adams, et al., and assigned to the assignee of the present invention, describes such a receiver. In yet another embodiment, one of the other metrics used is a comparison of the in-channel carrier to adjacent channel interference.

In one embodiment, the EVM (possibly in combination with one or more other metrics) is used not only to select the data rate for transmitting to a remote station, but also to request the remote station send packets at a rate determined according to the EVM of signals received from that station.

In one embodiment, both the EVM and the RSSI of signals received from the remote station are passed to the MAC and examined. If the EVM indicates a low signal quality, but the RSSI indicates high signal power, the station can decide that this particular remote station transmits signals of low quality, even though the link may be good. The station can then decide whether or not to associate with such a remote station.

Sending Signal Quality Information to the Remote Station

Thus, a method and apparatus has been described for selecting an access point for association according to a measure of the EVM of signals to or from the access point.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

"Variants of the IEEE 802.11 standard" as used herein means the variants and proposed variants of the IEEE 802.11 standard. Variants are versions defined in clauses of the standard and proposed amendments of the standard.

It should be appreciated that although the invention has been described in the context of variants of the IEEE 802.11 standard that use OFDM packets, the invention is not limited to such contexts and may be utilized in various wireless network applications and systems, for example in a system that uses packets other than OFDM packets, e.g., the IEEE 802,11b standard, or in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in transceivers conforming to other standards and for other applications, including other WLAN standards, Bluetooth, GSM, PHS, CDMA, and other cellular wireless telephony standards.

While one embodiment of the OFDM receiver (FIG. 3) accepts an IF signal that requires further down-conversion to obtain baseband I,Q signals, in another embodiment, the analog portion provides baseband I,Q signals that require no further down-conversion.

While one embodiment of the station (FIG. 2) is for half-duplex operation, and includes a transmit/receive switch 204, other embodiments are for full duplex operation.

The phrase "an EVM calculator that determines a measure of the EVM" and similar phrases include the case of EVM calculator 229 described above that determines in hardware the numerator of an expression a function of the calculated EVM and passes the numerator and denominator to the MAC processor so that no division is carried out by the EVM calculator 229 itself.

While the embodiments above use an EVM calculator that determines a measure of the EVM that is proportional to the square of the calculated EVM, other embodiments may use other measures of the EVM. All such other measures of the EVM, so long as they are monotonic functions of an approximation of the EVM, are within the scope of the invention.

While embodiments above use an EVM calculator that excludes the pilot tones, other embodiments may use a measure of the EVM that includes the pilot tones.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

We claim:

1. An apparatus for inclusion in a station of a wireless network, the apparatus comprising:
   a radio receiver to wirelessly receive data from at least one remote station, said data transmitted by the remote station as at least one packet of data, the receiver including an analog-to-digital converter producing samples of signals received at the station from the remote station, a packet of data including a part modulated in a pre-defined way and containing information indicative of the type of modulation used for at least some of the packet;
   a demodulator coupled to the radio receiver to demodulate samples of the signals received at the receiver from each station to produce demodulated signals from each of the remote stations;
   an error vector magnitude (EVM) calculator coupled to the receiver and to the demodulator, the EVM calculator operative to determine for each remote station from which data is received a measure of the received signal quality based on the samples of the received data from the remote station, the EVM calculator arranged to accept from the demodulator an indication of the type of modulation used for at least some of the packet; and
   a transmitter to transmit data for transmission,
   such that in the case that the received data is ascertained to include a request management message, the station responds to the request management message with a response management message that includes a measure of the EVM of received data corresponding to the request management message, whereby the remote station receiving the response management message receives an indication of a quality of a link between the station and the remote station without said receiving remote station necessarily being EVM-capable.

2. An apparatus as recited in claim 1, wherein the request management message is an association or reassociation request MAC frame, and wherein the response management message that includes the measure of the EVM is an association or reassociation response MAC frame.

3. An apparatus as recited in claim 1, wherein the request management message is a probe request MAC frame, and wherein the response management message that includes the measure of the EVM is a probe response MAC frame.

4. An apparatus as recited in claim 1, wherein the request management message is a measurement request MAC frame, and wherein the response management message that includes the measure of the EVM is a measurement response MAC frame.

5. An apparatus as recited in claim 1, wherein the wireless network substantially conforms to the IEEE 802.11 wireless networking standard, and wherein the request management message and the response management message are MAC frames.

6. An apparatus for inclusion in a station of a wireless network, the apparatus comprising:
   a radio receiver to wirelessly receive data from at least one remote station, said data transmitted by the remote station as at least one packet of data, the receiver including an analog-to-digital converter producing samples of signals received at the station from the remote station, a packet of data including a part modulated in a pre-defined way and containing information indicative of the type of modulation used for at least some of the packet;
   a demodulator coupled to the radio receiver to demodulate samples of the signals received at the receiver from each station to produce demodulated signals from each of the remote stations;
   an error vector magnitude (EVM) calculator coupled to the receiver and to the demodulator, the EVM calculator operative to determine for each remote station from which data is received a measure of the received signal quality based on the samples of the received data from the remote station, the EVM calculator arranged to accept from the demodulator an indication of the type of modulation used for at least some of the packet, and
   a transmitter to transmit data for transmission,
   wherein a message to a particular remote station in response to the data received from the particular remote station includes a measure of the EVM of the data received from the particular remote station.

7. An apparatus as recited in claim 6, wherein the wireless network substantially conforms to a wireless networking standard, and wherein a packet according to the wireless networking standard includes a header having a first field modulated at a known rate, the first field including the part containing information indicative of the type of modulation, and wherein the message to the particular station includes the measure of the EVM in the first field.

8. An apparatus as recited in claim 7, wherein the wireless networking standard is one of the OFDM variants of the IEEE 802.11 standard.

9. An apparatus for inclusion in a station of a wireless network, the apparatus comprising:
   a radio receiver to wirelessly receive data from at least one remote station, said data transmitted by the remote station as at least one packet of data, the receiver including an analog-to-digital converter producing samples of signals received at the station from the remote station, a packet of data including a part modulated in a pre-defined way and containing information indicative of the type of modulation used for at least some of the packet;
   a demodulator coupled to the radio receiver to demodulate samples of the signals received at the receiver from each station to produce demodulated signals from each of the remote stations; and
   an error vector magnitude (EVM) calculator coupled to the receiver and to the demodulator, the EVM calculator operative to determine for each remote station from which data is received a measure of a received signal quality based on the samples of the received data from the remote station, the EVM calculator arranged to accept from the demodulator an indication of the type of modulation used for at least some of the packet,
   such that, the receiving station selects one of the remote stations for communication according to a set of at least one criterion, said set including the respective received signal quality measure determined by the EVM calculator for data from each of the respective remote stations.

10. An apparatus as recited in claim 9, wherein at least some of the remote stations are access points, and wherein the receiving station selects one of the access points for association according to a set of at least one criterion, said set including the respective received signal quality measure determined by the EVM calculator for data from each of the respective access points.

11. An apparatus as recited in claim 9, wherein the network substantially conforms to one of the IEEE 802.11 standards.

12. An apparatus as recited in claim 9, wherein the EVM calculator is to determine for each remote station from which data is received a measure of the EVM of the received data from the remote station based on samples approximately at decision points of the demodulator.

13. An apparatus as recited in claim 12, wherein at least some of the stations from which data is received are access points, and wherein the data received from remote stations that are access points are beacons or probe responses, such that one of the criteria for the station to select a remote access point for association is a measure of the EVM of a beacon or probe response received from the access point.

14. An apparatus as recited in claim 12, wherein one of the remote stations is an access point with which the station is associated, such that the station decides whether or not to roam according to the measure of signal quality from data received from the remote access point with which the station is associated.

15. An apparatus as recited in claim 9, further comprising:
a transmitter to transmit data for transmission to at least one remote station,
wherein in the case that the received data is ascertained to be a probe request, an association request or a reassociation request, a packet for transmission by the transmitter from the station to a particular remote station that sent the request includes a measure of the EVM of the request received from the particular remote station.

16. An apparatus as recited in claim 15, wherein the station ascertaining whether the received data is a probe request is an access point.

17. An apparatus as recited in claim 15, wherein the station ascertaining whether the received data is a probe request is a candidate for communication on an ad-hoc basis.

18. An apparatus as recited in claim 15, wherein the transmitter has a settable data rate, the data rate set according to a data rate signal accepted by the transmitter,
said apparatus further comprising:
a data rate setting processor coupled to the EVM calculator and to the transmitter and producing the data rate signal for the transmitter, the data rate signal set such that the data rate for transmission to a particular remote station is dependent on the measure of the signal quality produced by the EVM calculator from signals received from the particular remote station.

19. An apparatus as recited in claim 18, wherein the measure of the signal quality of the received packet is based on samples approximately at decision points of the demodulator.

20. An apparatus as recited in claim 19, wherein the data rate processor is part of a MAC layer processor for the station.

21. An apparatus as recited in claim 9, wherein the packets of data are OFDM packets, and wherein the demodulator is coupled to the receiver via a discrete Fourier transformer that produces modulated sub-carrier signals of packets received from the remote station, such that the demodulation is of the modulated sub-carrier signals.

22. An apparatus for inclusion in a station of a wireless network, the apparatus comprising:
a radio receiver to wirelessly receive data from a remote station, said data transmitted by the remote station as at least one packet of data, the receiver including an analog-to-digital converter producing samples of signals received at the station from the remote station, a packet of data including a part modulated in a pre-defined way and containing information indicative of the type of modulation used for at least some of the packet;
a demodulator coupled to the receiver to demodulate samples of the signals received at the receiver to produce demodulated signals, the samples at decision points;
a transmitter to transmit data for transmission to the remote station, the transmitter having a settable data rate, the data rate set according to a data rate signal accepted by the transmitter; and
a data rate setting processor coupled to the demodulator and to the transmitter and producing the data rate signal for the transmitter, the data rate signal set such that in the case that a packet received at the station from a particular remote station includes an error vector magnitude (EVM) measure of a signal quality of a signal transmitted by the station and received at the particular remote station, the data rate for transmission to the particular remote station is dependent on the included EVM measure of the received signal quality,
wherein in the case the packet received from the particular remote station includes the EVM measure, the particular remote station includes an EVM calculator coupled to a particular receiver at the particular remote station and to a particular demodulator at the particular remote station and operative to determine a received signal EVM measure based on the samples of data received at the particular remote station, the EVM calculator arranged to accept from the particular remote station's demodulator an indication of the type of modulation used for at least some of a packet received at the particular remote station.

23. An apparatus as recited in claim 22, wherein the packet that includes the EVM measure of the received signal quality is a MAC layer data unit.

24. An apparatus as recited in claim 22, wherein the network substantially conforms to one of the IEEE 802.11 standards.

25. A method in a station of a wireless network, the method comprising:
wirelessly transmitting a request management message;
wirelessly receiving data from at least one remote station, said data transmitted by the remote station as at least one packet of data, a packet of data including a part modulated in a pre-defined way and containing information indicative of the type of modulation used for at least some of the packet;
sampling the received data corresponding to the received packet to form data samples;
demodulating the data samples;
ascertaining if the received data includes a response management message transmitted in response to a request management message; and
if it is ascertained that the received data includes the response management message, ascertaining if a packet has been received from the particular remote station that transmitted the response management message indicating a measure of a signal quality of the data remotely received at the particular remote station corresponding to the transmitted request management message, wherein the measure of signal quality includes a measure of the error vector magnitude (EVM) determined at the particular remote station based on the samples of data received at the particular remote station and an indication of the type of modulation used for at least some of a packet received at the particular remote station,
such that the message indicating the measure of signal quality can be used as an indication of the quality of communication achievable between the station and the particular remote station.

26. A method as recited in claim 25, further comprising:
if it is ascertained that such a packet has been received from the particular remote station, selecting whether or not to associate with the particular remote station according to at least the measure of the signal quality of the remotely received data.

27. A method as recited in claim 26, wherein the measure of the EVM of the received data is determined from received samples approximately at the decision points for demodulating the received data.

28. A method as recited in claim 27, further comprising:
selecting the data rate for communicating with the remote station according to at least the determined measure of the EVM.

29. A method as recited in claim 27, wherein the request management MAC frame is an association or reassociation request frame, and wherein the response management MAC frame that includes the measure of the EVM is an association or reassociation response frame.

30. A method as recited in claim 27, wherein the request management MAC frame is a probe request frame, and wherein the response management MAC frame that includes the measure of the EVM is a probe response frame.

31. A method as recited in claim 27, wherein the wireless network substantially conforms to the IEEE 802.11 wireless networking standard.

32. A method in a station of a wireless network, the method comprising:
wirelessly receiving a signal from at least one remote station, said signal transmitted by the remote station as at least one packet of data, a packet of data including a part modulated in a pre-defined way and containing information indicative of the type of modulation used for at least some of the packet;
demodulating samples of the received signals to produce demodulated signals from each of the remote stations, including ascertaining an indication of the type of modulation used for at least some of the packet, the ascertaining including demodulating the part containing information indicative of the type of modulation;
calculating a measure of the received signal quality for the signals received from the remote station using samples of the received signal from the remote stations and respective indications of the types of modulation used in the respective received signals, the measure of received signal quality being a measure of the error vector magnitude (EVM);
ascertaining whether the received data from any remote station is a request management message; and
in the case it is ascertained that a request management message was received from a particular remote station, responding to the request management message by transmitting to the particular remote station a response management message that include a measure of the EVM of received data corresponding to the request management message,
such that the particular remote station receiving the response management message receives an indication of a quality of the link between the station and the remote station without said receiving remote station necessarily being EVM-capable.

33. A method as recited in claim 32, wherein the request management message is an association or reassociation request MAC frame, or a probe request MAC frame, and wherein the response management message that includes the measure of the EVM is an association or reassociation response MAC frame in response to an association or reassociation request MAC frame, or a probe response MAC frame in response to a probe request MAC frame.

34. An apparatus for a station of a wireless network, the apparatus comprising:
means for wirelessly receiving data from at least one remote station, said data transmitted by the remote station as at least one packet of data, a packet of data including a part modulated in a pre-defined way and containing information indicative of the type of modulation used for at least some of the packet;
means for sampling the received data corresponding to the received packet to form data samples;
means for demodulating the data samples including demodulating the part modulated in the pre-defined way;
means for determining a measure of signal quality from the samples of the received data, the means for determining a measure of signal quality coupled to the means for sampling and to the means for demodulating;
means for ascertaining whether or not at least some of the remote stations are access points, and
means for selecting one of the access points for association in the case it is ascertained that at least some of the remote stations are access points, the selecting according to a set of least one criteria including the respective determined received signal quality measure for data from each of the access points,
wherein the means for determining a measure of signal quality includes means for determining a measure of the error vector magnitude (EVM) using an indication of the type of modulation used for at least some of the packet.

35. An apparatus as recited in claim 34, wherein the means for determining of the measure of signal quality includes means for determining the measure of the EVM of the received data from received samples approximately at the decision points for demodulating the data.

36. An apparatus as recited in claim 35, wherein the station is an access point, wherein the means for ascertaining whether a remote station is an access point includes means for ascertaining whether the received data includes a probe request, an association request or a reassociation request, the apparatus further comprising:
means for transmitting a packet to a remote station,
wherein in the case that the received data is ascertained to be a request, the transmitting means transmits data in response to the request that includes an indication of the determined measure of the EVM of the packet received from the particular remote station.

37. An apparatus in a station of a wireless network, the apparatus comprising:
means for wirelessly transmitting a request management message;
means for wirelessly receiving data from at least one remote station, said data transmitted by the remote station as at least one packet of data, a packet of data including a part modulated in a pre-defined way and containing information indicative of the type of modulation used for at least some of the packet;
means for sampling the received data corresponding to the received packet to form data samples;
means for demodulating the data samples;
means for ascertaining if the received data includes a response management message transmitted in response to a request management message; and
means for determining if a packet has been received from the particular remote station that transmitted the response management message indicating a measure of a signal quality of the data remotely received at the particular remote station corresponding to the transmitted request management message, the determining carried out if it is ascertained that the received data includes the response management message, wherein the measure of signal quality includes a measure of the error vector magnitude (EVM) determined at the particular remote station based on the samples of data received at the particular remote station and an indication of the type of modulation used for at least some of a packet received at the particular remote station, such that the message indicating the measure of signal quality can be used as an indication of the quality of communication achievable between the station and the particular remote station.

38. An apparatus as recited in claim 37, further comprising:
means for selecting whether or not to associate with the particular remote station according to at least the measure of the signal quality of the remotely received data, said selecting if it is ascertained that such a packet has been received from the particular remote station.

39. An apparatus as recited in claim 38, wherein the measure of the EVM of the received data is determined from received samples approximately at the decision points for demodulating the received data.

40. An apparatus in a station of a wireless network, the apparatus comprising:
means for wirelessly receiving a signal from at least one remote station, said signal transmitted by the remote station as at least one packet of data, a packet of data including a part modulated in a pre-defined way and containing information indicative of the type of modulation used for at least some of the packet;
means for demodulating samples of the received signals to produce demodulated signals from each of the remote stations, including means for ascertaining an indication of the type of modulation used for at least some of the packet by demodulating the part containing information indicative of the type of modulation;
means for calculating a measure of the received signal quality for the signals received from the remote station using samples of the received signal from the remote stations and respective indications of the types of modulation used in the respective received signals, the measure of received signal quality being a measure of the error vector magnitude (EVM);
means for ascertaining whether the received data from any remote station is a request management message;
means for transmitting; and
means for responding to the request management message in the case it is ascertained that a request management message was received from a particular remote station, the means for responding couples to the means for transmitting and transmitting to the particular remote station a response management message that include a measure of the EVM of received data corresponding to the request management message, such that the particular remote station receiving the response management message receives an indication of the quality of the link between the station and the remote station without said receiving remote station necessarily being EVM-capable.

41. An apparatus as recited in claim 40, wherein the request management message is an association or reassociation request MAC frame, or a probe request MAC frame, and wherein the response management message that includes the measure of the EVM is an association or reassociation response MAC frame in response to an association or reassociation request MAC frame, or a probe response MAC frame in response to a probe request MAC frame.

42. A method in a wireless station, the method comprising:
wirelessly receiving a signal from a remote station corresponding to a packet transmitted by the remote station, a packet of data including a part modulated in a pre-defined way and containing information indicative of the type of modulation used for at least some of the packet;
demodulating samples of the received signal to produce demodulated signals from the remote station, including demodulating the part modulated in the pre-defined way;
determining at the station the measure of the received error vector magnitude (EVM) from samples of the received signal and from the information indicative of the type of modulation used for at least some of the packet; and
selecting whether or not to associate with the remote station based on a measure of the EVM of data transported via the link between the station and the remote station.

43. A method as recited in claim 42, wherein the remote station is an AP and wherein the transmitted packet corresponding to the received signal includes a measure of the EVM obtained from samples of signals received by the remote station corresponding to data transmitted by the station, such that the selecting uses a measure of the received EVM of data transmitted in both directions via the link between the station and the remote station.

44. A method as recited in claim 42, wherein the transmitted packet corresponding to the received signal includes the measure of the EVM obtained from samples of signals received by the remote station corresponding to data transmitted by the station.

* * * * *

UNITED STATES PATENT AND TRADEMARK OFFICE
CERTIFICATE OF CORRECTION

PATENT NO. : 7,460,512 B2
APPLICATION NO. : 11/186045
DATED : December 2, 2008
INVENTOR(S) : Goodall et al.

It is certified that error appears in the above-identified patent and that said Letters Patent is hereby corrected as shown below:

In column 11, line 18, kindly change "of$f$(EVM$_{calc}$)" to --of $f$(EVM$_{calc}$)--

In column 11, line 20, kindly change "of$f$(EVM$_{calc}$)" to --of $f$(EVM$_{calc}$)--

In column 11, line 21, kindly change "∫(EVM$_{calc}$)" to --$f$(EVM$_{calc}$)--

In column 10, line 55, kindly replace the equation:

" $$EVM_{RMS} = \sqrt{\frac{\sum_{j=1}^{L_p}\left\{\left[\sum_{k=1}^{52}[(I(j,k)-I_0(j,k))^2 + (Q(j,k)-Q_0(j,k))^2]\right]\right\}}{52L_p \times P_0}}$$ "

with $$EVM_{RMS} = \sqrt{\frac{\sum_{j=1}^{L_p}\left\{\sum_{k=1}^{52}\left[(I(j,k)-I_0(j,k))^2 + (Q(j,k)-Q_0(j,k))^2\right]\right\}}{52L_p \times P_0}}$$

UNITED STATES PATENT AND TRADEMARK OFFICE
CERTIFICATE OF CORRECTION

PATENT NO. : 7,460,512 B2
APPLICATION NO. : 11/186045
DATED : December 2, 2008
INVENTOR(S) : Goodall et al.

It is certified that error appears in the above-identified patent and that said Letters Patent is hereby corrected as shown below:

In column 11, lines 45-50, kindly replace the equation $$f(EVM_{calc\_improved}) = \frac{\sum_{j=1}^{L_p}\left\{\left[\sum_{k=1}^{48}[(I(j,k) - I_0(j,k))^2 + (Q(j,k) - Q_0(j,k))^2]\right]\right\}}{48L_p \times P_0}$$

" ”

with $$f(EVM_{calc\_improved}) = \frac{\sum_{j=1}^{L_p}\left\{\sum_{k=1}^{48}\left[(I(j,k) - I_0(j,k))^2 + (Q(j,k) - Q_0(j,k))^2\right]\right\}}{48L_p \times P_0}$$

-- --

Signed and Sealed this

Fifteenth Day of December, 2009

David J. Kappos
*Director of the United States Patent and Trademark Office*